United States Patent [19]

Bolick et al.

[11] 4,215,581

[45] Aug. 5, 1980

[54] PRESSURE REGULATOR ASSEMBLY GUARD

[76] Inventors: Stephen M. Bolick, 2417 Windbreak Dr., Alexandria, Va. 22306; John O. Vought, 9256 Sprucewood Rd., Burke, Va. 22015

[21] Appl. No.: 74,853

[22] Filed: Sep. 13, 1979

[51] Int. Cl.³ .............................................. G01D 11/24

[52] U.S. Cl. ........................................ 73/431; 137/382

[58] Field of Search .................. 73/431, 756; 137/382; 169/75

[56] References Cited

U.S. PATENT DOCUMENTS

| | | | |
|---|---|---|---|
| 2,946,223 | 7/1960 | Lauer, Jr. | 73/431 |
| 3,293,917 | 12/1966 | Vanderheyden | 73/431 |
| 3,320,811 | 5/1967 | Johnson et al. | 73/431 |
| 3,958,716 | 5/1976 | Korte | 137/382 |
| 4,088,194 | 5/1978 | Hard | 73/431 |

*Primary Examiner*—Donald O. Woodiel

*Attorney, Agent, or Firm*—Henderson & Sturm

[57] ABSTRACT

This invention relates to protective framework in general and more specifically to a protective guard member which is adapted to be secured to the throat of a compressed gas cylinder, and which encompasses the associated regulator valves and guages to prevent damage to the components and connections should the cylinder be tipped or knocked over.

9 Claims, 2 Drawing Figures

PRESSURE REGULATOR ASSEMBLY GUARD

BACKGROUND OF THE INVENTION

Cylinders of compressed gas are routinely employed in various commercial, industrial and medical environments. Most cylinders have an elongated configuration which makes them inherently unstable when placed in an upright position. This instability creates numerous problems for the person using the apparatus, since very little force is necessary to tip the cylinder over.

Using a medical environment as an example, it should be appreciated that a respiratory therapist must continuously make minor adjustments to the pressure regulators which are attached to, and control the flow of oxygen from the cylinders to insure that proper oxygen levels are being supplied to the patient. The therapist must have an unobstructed view of the pressure guage dials, and unrestricted access to the regulator valves, to make the necessary adjustments. All too often, when the therapist manipulates the valves, a force is imparted to the cylinder, which is sufficient to tip it over and send it crashing to the floor. They are also smashed on corners of hallway walls, elevator doors, doorways of patient rooms, and are generally mishandled and dropped.

Throughout the day there are many patients receiving oxygen that must be transported by respiratory therapists, orderlies, and nursing personnel from their rooms to the x-ray department, physical therapy, recovery rooms after surgery, and from the sperinl care area to the private or semi-private rooms after they are off the critical list. This accounts for heavy use and abuse of regulators.

While the cylinder is ruggedly constructed and virtually impervious to damage from such a fall, the regulator valves, guages and associated connections are vulnerable to damage by virtue of their extended position relative to the cylinder. This is particularly so, since the weight of the associated hardware is normally cantilivered from the throat to the cylinder, tending to unbalance the cylinder in that general direction.

When a cylinder is knocked over, the weight of the entire assembly is therefore transmitted directly to the neck portion of the connecting hardware, which is inserted into the throat of the cylinder. Since the gauges and regulators are very sensitive instruments, it is a very rare instance when the impact of the falling cylinder does not result in damage to these components. A more serious situation commonly arises when the weight of the falling cylinder is transmitted directly to the neck portion of the connecting hardware, and fractures it. Not only is the above described situation annoying and costly to the hospital, but the interruption of oxygen to the patient is obviously not beneficial, and may produce dire consequences for the individual involved.

This problem is not unique to the medical profession and there have been several prior art devices on other fields which have attempted to provide a solution, examples of which can be found in U.S. Pat. Nos. 3,958,716; 2,946,223; 3,293,917; and 3,320,811.

While these devices will provide some degree of protection for one or more of the components subject to damage, they do not adequately protect the entire assembly, nor do they provide unobstructed viewing of, or access to, the components, and they are particularly deficient in protecting the neck portion of the connecting hardware. They also permit the weight of the cylinder to be transmitted to the neck portion of the connecting hardware creating an extremely dangerous condition, with the cylinder becoming a propelled missile capable of massive destruction.

SUMMARY OF THE INVENTION

An object of the present invention is the provision of a rugged, lightweight regulator guage guard which is adapted to fit most standard compressed gas cylinders.

Another object is to provide a guard framework which surrounds the connecting hardware attached to the cylinder, allowing the unobstructed viewing of, and access to, the guages and regulator valves.

A further object of the invention is the provision of a guard member which prevents the fracturing of the neck portion of the connecting hardware, by insuring that the forces transmitted by the falling cylinder are transmitted directly to the relatively thick throat of the cylinder itself.

A still further object is the provision of a unique attaching mechanism which forms a protective collar around a portion of the cylinder throat in its assembled relationship.

These and other objects, advantages, and novel features of the present invention will become apparent from the following detailed description of the invention when considered in conjunction with the accompanying drawings.

DESCRIPTION OF THE PREFERRED EMBODIMENT

Figure 1:
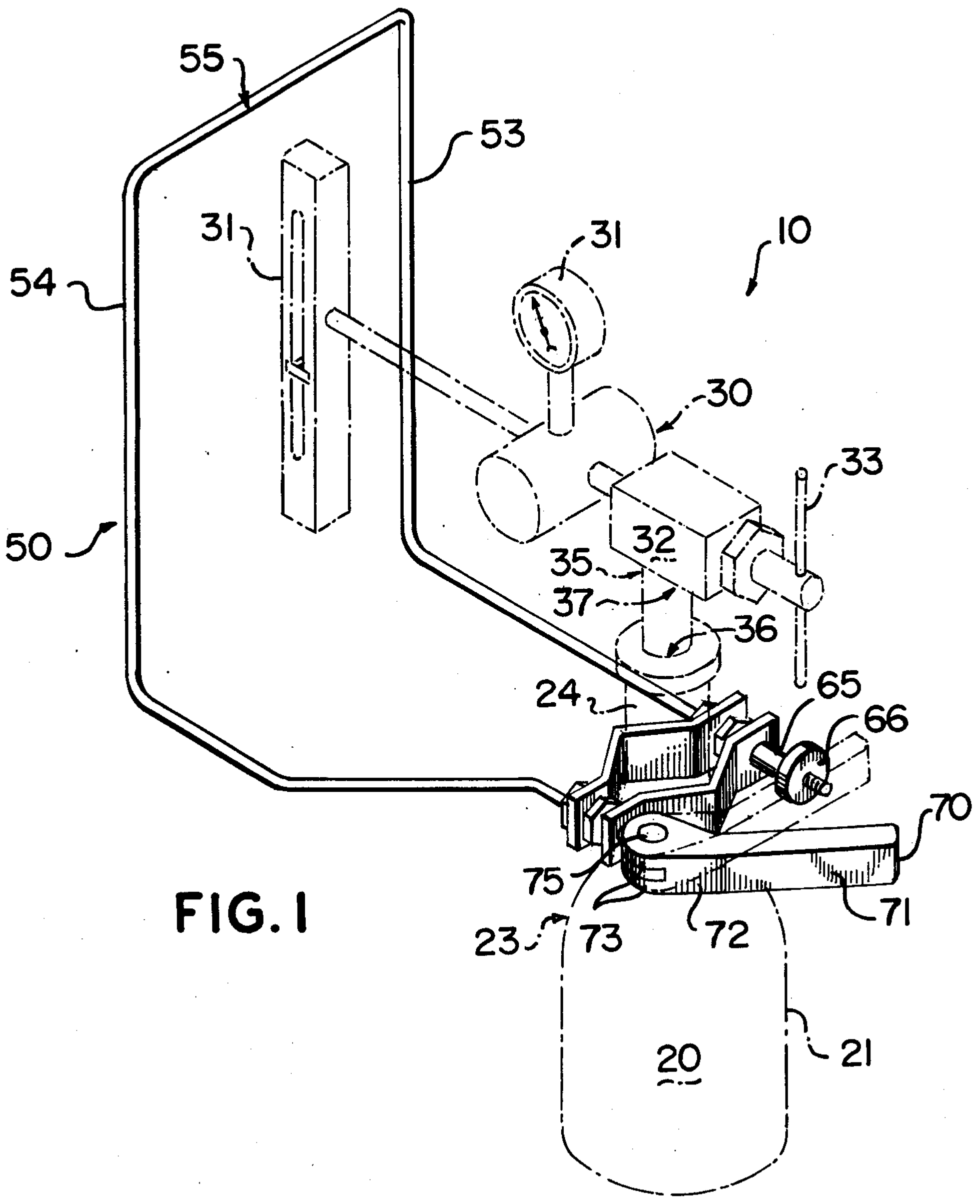
FIG. 1 is a perspective view of the regulator assembly guard as it would be affixed to a standard compressed gas cylinder.

As can be seen by reference to FIG. 1 the overall assembly is designated generally as 10, and comprises a compressed gas cylinder 20, a regulator assembly 30 and a guard member 50.

The cylinder 20 comprises an elongated cylinderical body 21, having a relatively flat base at one end, and a tapered shoulder portion 23 which terminates in a centrally disposed cylindrical throat member 24 at the other end. The throat member 24 is provided with a threaded opening containing a normally closed valve member (not shown) which cooperates with the regulator assembly 30 in a well known manner, to open and regulate a fluid passage from the interior of the cylinder to an end user such as a patient undergoing respiratory therapy. The regulator assembly 30 is a standard item, comprising one or more pressure indicating guages 31, which reflect the levels of pressure being drawn from the cylinder through the pressure regulator valves 32 in response to the position of the control knobs 33. The operator, which in the preferred embodiment is presumed to be a respiratory therapist, constantly monitors the guages 31 and manipulates the control knobs 33 to maintain the proper oxygen levels flowing through the assembly. The fluid path from the cylinder 20 to the patient is through a plurality of fluid couplings 34 which are connected to a "T" or inverted "L" shaped neck portion 35 which forms the inlet coupling 36 to the cylinder.

The exterior of the inlet coupling 36 threadedly engages the interior of the cylindrical throat member 24 of the cylinder or oxygen tank 20.

The cylinder walls are very thick, and designed to withstand tremendous impact forces, to prevent the sudden release of their pressurized contents. The guages are by their very nature delicate instruments subject to damage by minor impact forces, the regulator valves and fluid couplings are vulnerable to moderate impact forces, and neck portion 35 of the inlet couplings 36 has repeatedly experienced structural failure in the form of total fracture (in the area 37) when the initial point of impact of the falling cylinder is on the outboard end of the fluid coupling.

To prevent damage to the regulator assembly 30 a guard member 50 has been developed which attaches directly to the throat 24 of the cylinder 20 so that all impact forces are transmitted directly to the cylinder. The guard 50 comprises a rigid framework 51 formed from a steel rod having threaded end portions 52. The framework 51 is generally U-shaped in configuration with a bend of approximately 90° in the vicinity of its midpoint. The framework 51 is secured to the cylinder throat 24 by a plurality of clamps 60, 60' employed in conjunction with a unique securing mechanism which will be discussed further on.

As can be seen by reference to FIGS. 1 and 2 the guard 50 entends below, beyond and above the regulator assembly 30 which it encompasses. The drawings illustrte that the legs 53, 54 which comprise the framework 51 are parallel over a major portion of their combined running length. While the legs 53 and 54 are paralled in the vicinity of the clamps 60, 60' leg 54 soon diverges from leg 53 at an angle $\theta$, in the horizontal plane. This divergence continues for a certain distance, whereupon leg 54 again resumes its parallel relationship with leg 53. Both of the legs continue in the horizontal plane, a distance beyond the outboard end of the regulator 30. At this point the framework 51 projects vertically upward and the legs 53, 54 extend above the top of the regulator assembly 30, whereupon the legs 53, 54 converge in the horizontal plane to form the base portion 55 of the inverted U-shape of the framework. Since the framework 51 is in the form of an inverted loop, the portion 55 of the guard can also serve as a carrying handle for the cylinder 20.

Obviously the specific dimensions of the framework can be customized for special uses and various sized regulator assemblies. The only criteria for the dimensions of the framework are to insure that the guard, is spaced from, and extends below, beyond and above the external dimensions of the regulator. As can be seen in FIG. 2 the legs 53 and 54 diverge, so that the guard 50 extends beyond the regulator in both the horizontal and vertical planes.

Figure 2:
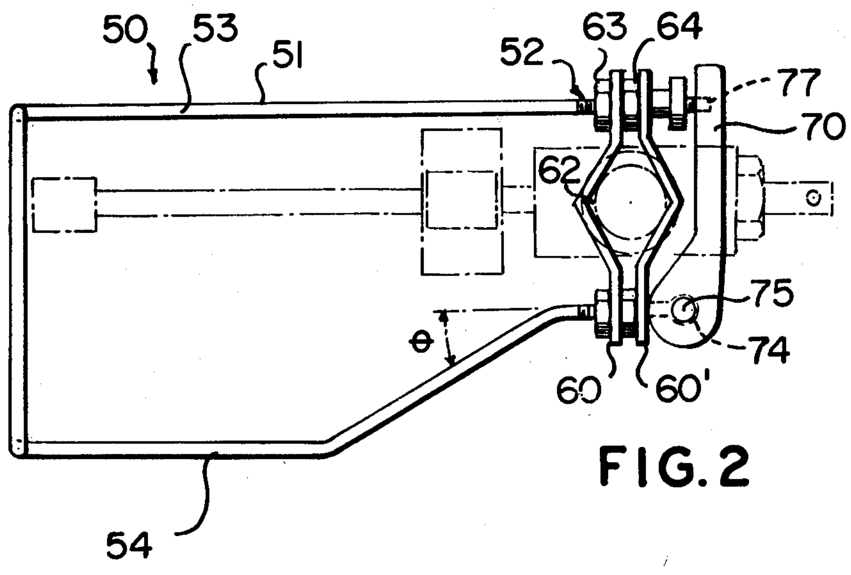
FIG. 2 is a top plan view showing how the guard framework surrounds the regulator assembly.

The securing mechanism which is illustrated in FIG. 2 comprises a pair of clamps 60 having a plurality of apertures dimensioned to receive the threaded ends 52 of the guard 50. The clamps 60 further are provided with recessed portions 62 which are dimensioned to engage the exterior of the cylindrical throat 24 of the oxygen tank 20. A pair of stop nuts 63 are threaded onto the arms 53, 54 to provide a bearing surface for the clamp member 60. Locking nuts 64 then secure clamp member 60 to the framework 51. Clamp 60 is then brought into engagement with one side of the cylinder throat 24, and clamp 60' is brought into engagement with the other side of the cylinder throat to form a split collar arrangement.

The clamps are secured to the cylinder by the engagement of two securing means 65 and 70 with the threaded end portion 52 of the framework and the exterior surface of clamp 60'. The securing means 65 comprises a locking nut having an enlarged head 66 which is ribbed to facilitate the manual rotation thereof. The securing means 70 comprises an elongated handle member 71 having a rounded end portion 72 in the form of bifurcated arms 73 with apertures 74 disposed therein. The handle member 71 is fabricated from hard plastic or similar material and the apertures 74 are dimensioned to receive a rigid cylindrical element 75. The cylindrical element 75 is preferrably formed to metal and has a threaded aperture 76 disposed therein which is adapted to engage a threaded end 52 of the framework 51.

After securing means 65 has been manually tightened against the exterior surface of clamp 60', the securing means 70 is rotated until the rounded end portion 72 of the elongated handle member 71 also engages the exterior surface of clamp 60'. The handle member 71 is pivotable about the cylindrical element 75 and has a recess 77 which is dimensioned to receive one of the threaded ends 52 of the framework. Once the clamp has been secured to the cylinder throat, the handle 71 may be pivoted to engage the other threaded end 52 in the recess 77 to prevent vertical displacement of the securing means 70. In this position the handle 71 forms a partial protective collar around that portion of the cylinder throat which is furthest from the regulator assembly 30.

It can thus be seen that a protective guard constructed in accordance with the teachings disclosed herein, will result in a structure which will transmit all impact forces directly to the cylinder, provided unobstructed, viewing of, and access to, the regulator assembly, as well as satisfying all of objects stated supra.

Having thereby disclosed the subject matter of this invention it should be obvious that many modifications, substitutions and variations of the invention are possible in light of the above teachings. It is therefore to be understood, that the invention may be practiced other than as specifically described, and should be limited only by the breadth and scope of the appended claims.

What we claim is:

1. A gauge guard for use with a pressure regulating assembly, including pressure regulating valves, regulator gauges and a plurality of fluid couplings operatively connecting the regulator assembly to a source of pressurized gas; where the source of pressurized gas is an elongated cylinder, having a cylindrical throat member into which one of the plurality of fluid couplings is inserted, the gauge guard comprising;
   - a pair of clamp members engaging a portion of the cylinder,
   - a rigid framework, extending through the clamp members which is spaced from, and projects below, beyond and above the regulator assembly, and
   - a securing means for fastening the clamp members and the framework to a portion of the cylinder.

2. A gauge guard as in claim 1; wherein;
   - the framework is dimensioned to extend beyond the regulator assembly in the vertical and horizontal planes.

3. A gauge guard as in claim 2; wherein, the framework comprises, a rod formed into the shape of a loop having two legs, and the legs are disposed parallel to one another over a major portion of their combined length.

4. A gauge guard as in claim 3; wherein, the ends of the legs are adapted to be engaged by the securing means to fasten the clamp member to a portion of the cylinder.

5. A gauge guard as in claim 4; wherein, the cylindrical throat member comprises the portion of the cylinder which is engaged by the clamp members.

6. A gauge guard as in claim 5; wherein, the securing means comprises;

a handle member which is adapted to engage both legs of the rigid framework.

7. A gauge guard as in claim 6; wherein, said handle member is rotatably and pivotally disposed on one leg of the rigid framework.

8. A gauge guard as in claim 7; wherein, said handle member is further provided with a recess configured to receive the other leg of the rigid framework to prevent the vertical displacement of the handle when the other leg is inserted in said recess.

9. A gauge guard as in claim 8; wherein said handle member is pivotally disposed on an internal cylindrical element having a threaded aperture which engages said one leg of the rigid framework.

* * * * *